United States Patent
Collina et al.

(10) Patent No.: US 9,598,509 B2
(45) Date of Patent: *Mar. 21, 2017

(54) MAGNESIUM DICHLORIDE-ETHANOL ADDUCTS AND CATALYST COMPONENTS OBTAINED THEREFROM

(75) Inventors: Gianni Collina, Ferrara (IT); Daniele Evangelisti, Ferrara (IT); Ofelia Fusco, Ferrara (IT); Benedetta Gaddi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 284 days.

This patent is subject to a terminal disclaimer.

(21) Appl. No.: 13/996,629

(22) PCT Filed: Dec. 16, 2011

(86) PCT No.: PCT/EP2011/073117
§ 371 (c)(1),
(2), (4) Date: Jun. 21, 2013

(87) PCT Pub. No.: WO2012/084735
PCT Pub. Date: Jun. 28, 2012

(65) Prior Publication Data
US 2013/0274428 A1     Oct. 17, 2013

Related U.S. Application Data

(60) Provisional application No. 61/427,139, filed on Dec. 24, 2010.

(30) Foreign Application Priority Data

Dec. 24, 2010 (EP) .................. 10196980

(51) Int. Cl.
| | |
|---|---|
| *C08F 4/10* | (2006.01) |
| *C08F 4/58* | (2006.01) |
| *C08F 4/16* | (2006.01) |
| *C08F 10/00* | (2006.01) |
| *C08F 110/06* | (2006.01) |

(52) U.S. Cl.
CPC ............... *C08F 4/10* (2013.01); *C08F 4/16* (2013.01); *C08F 4/58* (2013.01); *C08F 10/00* (2013.01); *C08F 110/06* (2013.01)

(58) Field of Classification Search
CPC ...... C08F 4/10; C08F 4/16; C08F 4/58; C08F 10/00; C08F 110/06
USPC ............... 526/125.3; 502/125, 107
See application file for complete search history.

(56) References Cited

U.S. PATENT DOCUMENTS

| | | | |
|---|---|---|---|
| 4,399,054 A | 8/1983 | Ferraris et al. | |
| 2005/0014632 A1 | 1/2005 | Evangelisti et al. | |
| 2009/0306316 A1* | 12/2009 | Morini ................ | C08F 10/02 526/124.3 |
| 2012/0283402 A1* | 11/2012 | Evangelisti et al. ........ | 526/187 |
| 2012/0329963 A1* | 12/2012 | Brita ..................... | C08F 10/00 526/125.8 |

FOREIGN PATENT DOCUMENTS

| | | |
|---|---|---|
| EP | 0395083 | 10/1990 |
| WO | WO-2004026920 A1 | 4/2004 |
| WO | WO-2009112399 A1 | 9/2009 |
| WO | WO-2010146072 A1 | 12/2010 |

OTHER PUBLICATIONS

Seppala and Harkonen, "Effect of the structure of external alkoxysilane donors on the polymerization of propene with high activity Ziegler-Natta catalysts," Makromol. Chem., 190, 2535-2550 (1989).*

PCT International Search Report & Written Opinion mailed Feb. 20, 2012, for PCT/EP2011/073117.

* cited by examiner

*Primary Examiner* — Catherine S Branch

(57) ABSTRACT

A solid adduct comprising magnesium chloride and ethanol in which the moles of ethanol per mole of magnesium chloride range from 2 to 5 and in which the ratio between the average pore radius measured in Angstrom of said adduct, determined by mercury porosity, and the moles of ethanol, is higher than 500.

12 Claims, No Drawings

MAGNESIUM DICHLORIDE-ETHANOL ADDUCTS AND CATALYST COMPONENTS OBTAINED THEREFROM

This application is the U.S. National Phase of PCT International Application PCT/EP2011/073117, filed Dec. 16, 2011, claiming priority of European Patent Application No. 10196980.6, filed Dec. 24, 2010 and the benefit under 35 U.S.C. 119(e) of U.S. Provisional Application No. 61/427,139 filed Dec. 24, 2010, the contents of which are incorporated herein by reference in their entirety.

The present invention relates to magnesium dichloride/ethanol adducts which are characterized by particular chemical and physical properties. The adducts of the present invention are particularly useful as precursors of catalyst components for the polymerization of olefins.

$MgCl_2$.alcohol adducts and their use in the preparation of catalyst components for the polymerization of olefins are well known in the art.

In WO98/44009 are disclosed $MgCl_2$.alcohol adducts having improved characteristics and characterized by a particular X-ray diffraction spectrum, in which, in the range of $2\theta$ diffraction angles between 5° and 15°, the three main diffraction lines are present at diffraction angles $2\theta$ of 8.8 ±0.2°, 9.4±0.2° and 9.8±0.2°, the most intense diffraction lines being the one at $2\theta=8.8\pm0.2°$, the intensity of the other two diffraction lines being at least 0.2 times the intensity of the most intense diffraction line. Said adducts can be of formula $MgCl_2.mEtOH.nH_2O$ where m is between 2.2 and 3.8 and n is between 0.01 and 0.6. The catalyst components obtained from these adducts have high polymerization activity.

However, the adducts and the catalysts therefrom obtained may suffer from a certain morphological instability which, during catalyst preparation or polymerization, is responsible for catalyst or polymer breakages. It has been envisaged that the breakages may be correlated with a certain mechanical fragility of the particles.

As an attempt to improve the morphological stability, the adduct undergoes a dealcoholation treatment before the reaction with the titanium compound which increases the porosity of the final catalyst. Such a treatment can improve the stability of the adduct and of the deriving catalyst particles but also heavily reduces the catalyst activity.

In WO2004/026920 it is proposed to prepare adducts having an increased amount of alcohol and characterized by a particular X-ray diffraction spectrum. These adducts, if converted as such into catalyst component are able to generate catalysts with increased activity. On the other hand, if the adducts are partially dealcoholated before reaction with the Ti compound, provide a catalyst with a higher porosity compared to that generated by adducts having the same amount of alcohol obtained directly in preparation and not dealcoholated. However, the morphological stability of the adducts is still not satisfactory as when subject to catalyst preparation in large scale equipments a large amount of catalyst particles is broken.

The applicant has now found new $MgCl_2.mEtOH$ adducts having specific chemical and physical properties which are able to generate catalyst components having high activity, and morphological stability.

In particular, the adducts of the present invention are characterized by enhanced mechanical resistance with respect to the adducts of the prior art having the same alcohol content. Such enhanced mechanical resistance is evidenced by the increased resistance of the particles to break under the action of ultra sound waves.

Furthermore, the partial dealcoholation of the adducts allows the preparation of catalysts components that generate polymers with a higher porosity with respect to the polymers of the catalyst of the prior art.

Accordingly, it is an object of the present invention an adduct comprising magnesium chloride and ethanol in which the moles of ethanol per mole of magnesium chloride range from 2 to 5 and in which the ratio between the average pore radius of said adduct determined by mercury porosity and measured in Angstrom and the moles of ethanol, is higher than 500.

Preferably, said ratio is higher than 540, and more preferably higher than 600, in correspondence with a number of ethanol moles preferably ranging from 2.2 to 4.5, more preferably from 2.5 to 4.2. The adducts having the above mentioned features can be obtained according to the following method. In a first step, $MgCl_2$, ethanol and a suitable amount of water are contacted, heating the system at the melting temperature of $MgCl_2$-alcohol adduct or above, and maintaining said conditions so as to obtain a completely melted adduct. In particular, the adduct is preferably kept at a temperature equal to or higher than its melting temperature, under stirring conditions, for a time period equal to or greater than 2 hours, 2 to 50 hours and more preferably from 5 to 40 hours.

Due to the fact that both $MgCl_2$ and EtOH are highly hygroscopic a certain amount of water, usually about 0.4-0.5% wt is present in the final adduct when adopting the standard procedures. According to the present process it has been found that it is possible to obtain the above mentioned ratio between the average pore radius of said adduct and the moles of ethanol by introducing an additional amount of water so as to bring its content to at least 0.8% preferably to at least 1% more preferably to at least 1.5% and especially to at least 2% of the total weight of $MgCl_2$, ethanol and water mixture. In a particularly preferred aspect the amount of water ranges from 1% to 5% wt based on the total weight of the adduct. In terms of moles with respect to $MgCl_2$ the moles of water can range from 0.1 to 0.5.

Said molten adduct is then emulsified in a liquid medium which is immiscible with and chemically inert to it and finally quenched by contacting the adduct with an inert cooling liquid thereby obtaining the solidification of the adduct. It is also preferable, before recovering the solid particles, to leave them in the cooling liquid at a temperature ranging from −10 to 25° C. for a time ranging from 1 to 24 hours. Due to the characteristics of the process the composition of the final adduct substantially corresponds to the feeding composition.

The emulsifying liquid medium can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred.

The quenching liquid is preferably selected from hydrocarbons that are liquid at temperatures ranging from −30 to 30° C. Among them preferred are pentane, hexane, heptane or mixtures thereof.

In a variant of the above method, the particles of magnesium dichloride are dispersed in an inert liquid immiscible with and chemically inert to the molten adduct, the system is heated at temperature equal to or higher than the melting temperature of forming adduct and then the desired amount of ethanol/water mixture in vapour phase is added. The temperature is kept at values such that the adduct is completely melted. Once, obtained in molten form the process undergoes the same step described above.

The liquid in which the MgCl$_2$ is dispersed is of the same type of the emulsifying liquid disclosed above.

All these methods provide solid adducts having a substantially spherical morphology and average diameter comprised between 5 and 150 μm which are very suitable in the preparation of spherical catalyst components for the polymerization of olefins and in particular for the gas-phase polymerization process. With the term substantial spherical morphology are meant those particles having a ratio between the greater and smaller axis equal to or lower than 1.5 and preferably lower than 1.3.

The mercury porosity of the so obtained adducts ranges from 0.05 to 0.2 cm$^3$/g with pores having average pore radius from 0.18 to 0.35 μm, preferably from 0.2 to 0.3 μm. The adducts so obtained withstand to ultrasound treatments much better than those of the prior art having the same alcohol content but a lower pore radius/mole of alcohol ratio. In fact, the rate of reduction of the average particle size (P50) after 5 minutes of treatments according to the conditions specified below is much lower for the adducts of the invention than for those of the prior art. In particular, the P50 for the adduct of the invention after treatment is about 75% of the original while for the adduct of the prior art drop to about 50%. Also the particle size distribution (SPAN) of the adducts of the invention is preserved much better than that of the adducts of the prior art. After ultrasound treatment the particle size of the prior art adducts result to be much more dispersed than that of the adduct of the invention.

Upon reaction with transition metal compounds, the adducts of the invention form suitable catalyst components for the polymerization of olefins.

The adducts can be reacted as such with the transition metal compound or, in alternative, they can be subject to a preliminary step of dealcoholation.

Among transition metal compounds particularly preferred are titanium compounds of formula Ti(OR)$_n$X$_{y-n}$ in which n is comprised between 0 and y; y is the valence of titanium; X is chlorine and R is an hydrocarbon radical, preferably alkyl, radical having 1-10 carbon atoms or a COR group. Among them, particularly preferred are titanium compounds having at least one Ti—Cl bond such as titanium tetrachlorides or chloroalcoholates. Preferred specific titanium compounds are TiCl$_3$, TiCl$_4$, Ti(OBu)$_4$, Ti(OBu)Cl$_3$, Ti(OBu)$_2$Cl$_2$, Ti(OBu)$_3$Cl. Preferably, the reaction is carried out by suspending the adduct in cold TiCl$_4$ (generally 0° C.); then the so obtained mixture is heated up to 80-130° C. and kept at this temperature for 0.5-2 hours. After that the excess of TiCl$_4$ is removed and the solid component is recovered. The treatment with TiCl$_4$ can be carried out one or more times.

The reaction between transition metal compound and the adduct can also be carried out in the presence of an electron donor compound (internal donor) in particular when the preparation of a stereospecific catalyst for the polymerization of olefins is to be prepared. Said electron donor compound can be selected from esters, ethers, amines, silanes and ketones. In particular, the alkyl and aryl esters of mono or polycarboxylic acids such as for example esters of benzoic, phthalic, malonic and succinic acid are preferred. Specific examples of such esters are n-butylphthalate, di-isobutylphthalate, di-n-octylphthalate, diethyl 2,2-diisopropylsuccinate, diethyl 2,2-dicyclohexyl-succinate, ethyl-benzoate and p-ethoxy ethyl-benzoate. Moreover, can be advantageously used also the 1,3 diethers of the formula:

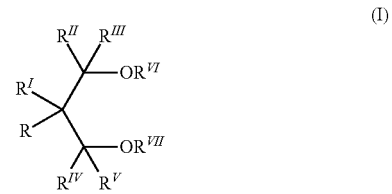

wherein R, R$^I$, R$^{II}$, R$^{III}$, R$^{IV}$ and R$^V$ equal or different to each other, are hydrogen or hydrocarbon radicals having from 1 to 18 carbon atoms, and R$^{VI}$ and R$^{VII}$, equal or different from each other, have the same meaning of R-R$^V$ except that they cannot be hydrogen; one or more of the R-R$^{VII}$ groups can be linked to form a cycle. The 1,3-diethers in which R$^{VI}$ and R$^{VII}$ are selected from C$_1$-C$_4$ alkyl radicals are particularly preferred. Also usable are the diolesters donors disclosed in U.S. Pat. No. 7,388,061.

The electron donor compound is generally present in molar ratio with respect to the magnesium comprised between 1:4 and 1:20.

Preferably, the particles of the solid catalyst components replicate those of the solid adducts illustrated above, thus showing a substantially spherical morphology and an average diameter comprised between 5 and 150 μm.

As mentioned before the reaction with the transition metal compound, the adducts of the present invention can also be subjected to a dealcoholation treatment aimed at lowering the alcohol content and increasing the porosity of the adduct itself. The dealcoholation can be carried out according to known methodologies such as those described in EP-A-395083. Depending on the extent of the dealcoholation treatment, partially dealcoholated adducts can be obtained having an ethanol content generally ranging from 0.1 to 3 moles of alcohol per mole of MgCl$_2$ and a porosity (determined with Hg method described below)) higher than 0.15 cm$^3$/g and preferably from 0.2 to 1.5 cm$^3$/g with pores having average pore radius from 0.14 to 0.3 μm, preferably from 0.15 to 0.3 μm.

Among this class particularly interesting are the dealcoholated adducts containing from 1 to 3 moles of alcohol and porosity in the range of 0.15 to 1.5 cm$^3$/g. After the dealcoholation treatment the adducts are reacted with the transition metal compound, according to the techniques described above, in order to obtain the solid catalyst components. When the dealcoholation treatment is carried out thermally, water is not removed or only to a limited extent. Therefore, its relative amount in the final partially dealcoholated adduct may be higher than that of the original one.

As mentioned before the solid catalyst components according to the present invention show a porosity (determined with Hg method) higher than 0.2 cm$^3$/g preferably between 0.25 and 2 cm$^3$/g. Surprisingly, the catalyst components comprising the reaction product of a transition metal compound with a MgCl$_2$-alcohol adduct which is in turn obtained by partially dealcoholating the adducts of the invention, show an improved balance properties like polymerization activity, stereospecificity, morphological stability (lower polymer breaks) and polymer porosity, with respect to the catalyst components prepared from the dealcoholated adducts of the prior art. Particularly interesting are the catalyst obtained by reacting the transition metal compound with dealcoholated adducts containing from 1 to 3 moles of alcohol. The so obtained catalysts generally show higher activity and stereospecificity and an improved balance of polymer properties such as porosity and lower percentage of breaks (morphological stability) over the catalyst generated from the adducts described in WO2004/026920.

The catalyst components of the invention form catalysts for the polymerization of alpha-olefins $CH_2=CHR$, wherein R is hydrogen or a hydrocarbon radical having 1-12 carbon atoms, by reaction with Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

The Al/Ti ratio is higher than 1 and is generally comprised between 20 and 2000.

In the case of the stereoregular polymerization of α-olefins such as for example propylene and 1-butene, an electron donor compound (external donor) which can be the same or different from the compound used as internal donor can be used in the preparation of the catalysts disclosed above. In case the internal donor is an ester of a polycarboxylic acid, in particular a phthalate, the external donor is preferably selected from the silicon compounds containing at least a Si—OR link, having the formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the 1,3 diethers having the previously described formula can be used as external donor. However, in the case 1,3-diethers are used as internal donors, the use of an external donor can be avoided, as the stereospecificity of the catalyst is already sufficiently high.

As previously indicated the components of the invention and catalysts obtained therefrom find applications in the processes for the (co)polymerization of olefins of formula $CH_2=CHR$ in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

The following examples are given to illustrate and not to limit the invention itself.

Characterization

Porosity and Surface Area with Nitrogen: are determined according to the B.E.T. method (apparatus used SORPTOMATIC 1900 by Carlo Erba).

Porosity and Surface Area with Mercury:

The measure is carried out using a "Pascal 240" series porosimeter by Carlo Erba.

The porosity is determined by intrusion of mercury under pressure. For this determination use is made of a calibrated dilatometer (capillary diameter 3 mm) CD3P (by Carlo Erba) connected to a reservoir of mercury and to a high-vacuum pump. A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity (cm³/g) (for supports and catalysts due to pores up to 1 μm and for polymer up to 10 μm) and the pore distribution curve, are directly calculated from the integral pore distribution curve, which is function of the volume reduction of the mercury and applied pressure values (all these data are provided and elaborated by the porosimeter associated computer which is equipped with a dedicated Pascal software supplied by C. Erba.

The average pore size is determined as the weighted average by the pore distribution curve summing up all the values obtained by multiplying the relative volume of each pore fraction in the range of the curve by the average pore radius of the said fraction and dividing by 100 the so obtained sum.

Testing of Mechanical Stability by Ultrasounds

For morphological evaluation of support and catalyst samples by ultrasounds a Malvern Mastersizer 2000 instrument was used. Mastersizer 2000 particle size analyzer is normally divided into three units:
1) optical unit; Optical core unit suitable for measurements of solids of sizes ranging from 0.02 to 2000μ, equipped with two laser beam sources: red He/Ne laser, power 5 mw, wave length 633 nm., blue (diode) laser, wave length 450 nm.
2) sampling Unit; Hidro 2000S automatic Sampling Unit for volumes between 50 and 120 ml, operating with internal capacity, centrifuge pump, stirrer and ultrasound probe with 40 W power output.
3) PC console; Portable LG Pentium series, using Malvern Professional software for Windows 2000 or NT. Method of data elaboration using Mie optics theory (Refractive Index for sample=1.596; Refractive Index for n-heptane=1.39).

Method Description

For the measurements n-heptane (plus 2 g/l antistatic Span 80) is used as dispersing agent.

Measuring cell is loaded with dispersing agent, while pump/agitator speed is set up to 2205 RPM. Background measurement is then taken. Then sample is loaded, by using a dedicated loading mean for solids or slurries Obscuration is then checked on monitor. Once constant steady obscuration is reached, the sample is subject to ultrasound waves by bringing the intensity of ultrasound probe to full scale (100% of the regulator) for 10 seconds; stability of sample is then measured by PSD measurement with Malvern Instrument. Acquisition data are then stored and a further ultrasound treatment is produced, lasting overall for 5 minutes. While ultrasound is being applied to the same sample, PSD data are saved at different times, performing the data calculation at the desired analyses times. After completion of the 5 minutes test, slurry sample is gathered and used for optical observations, and a picture is also taken to show the effect of ultrasound on morphological stability of the sample.

Average Particle Size and Particle Size Distribution of the Adduct and Catalysts They are determined according to the same apparatus and method described for the testing of mechanical stability. The only difference is that before being subject to PS Determination the sample undergoes 30 seconds of Ultrasound treatment.

The average size is given as P50.

The particle size distribution (SPAN) is calculated with the formula $$\frac{P90 - P10}{P50}$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

EXAMPLES

General Procedure for the Preparation of the Catalyst Component

Into a 1 l steel reactor provided with stirrer, 500 cm³ of $TiCl_4$ at 0° C. were introduced; at room temperature and whilst stirring 30 g of the adduct were introduced together with an amount of diisobutylphthalate as internal donor so as to give a Mg/donor molar ratio of 8. The whole was heated to 100° C. over 90 minutes and these conditions were maintained over 60 minutes. The stirring was stopped and after 15 minutes the liquid phase was separated from the sedimented solid maintaining the temperature at 100° C. A further treatment of the solid was carried out adding 500 cm³ of $TiCl_4$ and heating the mixture at 110° C. over 10 min. and maintaining said conditions for 30 min under stirring conditions (500 rpm). The stirring was then discontinued and after 30 minutes the liquid phase was separated from the sedimented solid maintaining the temperature at 110° C. Two further treatment of the solid was carried out adding 500 cm³ of $TiCl_4$ and heating the mixture at 120° C. over 10 min. and maintaining said conditions for 30 min under stirring conditions (500 rpm). The stirring was then discontinued and after 30 minutes the liquid phase was separated from the sedimented solid maintaining the temperature at 120° C. Thereafter, 3 washings with 500 cm³ of anhydrous hexane at 60° C. and 3 washings with 500 cm³ of anhydrous hexane at room temperature were carried out. The solid catalyst component obtained was then dried under vacuum in nitrogen environment at a temperature ranging from 40-45° C.

General Procedure for the Polymerization Test

A 4 litre steel autoclave equipped with a stirrer, pressure gauge, thermometer, catalyst feeding system, monomer feeding lines and thermostatting jacket, was used. The reactor was charged with 0.01 gr. of solid catalyst component 0.76 g of TEAL, 0.06 g of cyclohexylmethyldimethoxysilane, 3.2 l of propylene, and 2.0 l of hydrogen. The system was heated to 70° C. over 10 min. under stirring, and maintained under these conditions for 120 min. At the end of the polymerization, the polymer was recovered by removing any unreacted monomers and was dried under vacuum.

Example 1

In a vessel reactor equipped with a IKA RE 166 stirrer containing 1062 g of anhydrous EtOH at −8° C. were introduced under stirring 547 g of $MgCl_2$ and 11 g of water. Once the addition of $MgCl_2$ was completed, the temperature was raised up to 108° C. and kept at this value for 20 hrs. After that, while keeping the temperature at 108° C., the melt was fed by volumetric pump set to 62 ml/min together with OB55 oil fed by volumetric pump set to 225 ml/min, to an emulsification unit operating at 2800 rpm and producing an emulsion of the melt into the oil. While melt and oil were fed in continuous, the mixture at about 108° C. was continuously discharged into a vessel containing 22 liters of cold hexane which was kept under stirring and cooled so that the final temperature did not exceed 12° C. After 24 hours, the solid particles of the adduct recovered were then washed with hexane and dried at 40° C. under vacuum. The compositional analysis showed that the particles contained 63% by weight of EtOH, 1.0% of water the remaining being $MgCl_2$. The porosity, due to pores, up to 1 µm was 0.106 cm³/g while the average pore radius was 2204. Its average particle size (P50) was 67.8 µm. The SPAN was 1.6.

Then, said adduct was used to prepare, according to the general procedure, the catalyst component the properties of which are reported in table 1. The catalyst was then used in a polymerization test carried out according to the procedure described above the results of which are reported in Table 2. In addition, part of the so obtained adduct particles have been subject to a mechanical stability test by ultrasounds treatment carried out according to the method described above. After 5 minutes treatment the P50 became 52.5 μm while the SPAN was unchanged (1.6).

Example 2

The same procedure described for example 1 was followed with the difference that 20 gr. of water were introduced.

The compositional analysis showed that the particles contained 63.5% by weight of EtOH, 1.9% of water the remaining being $MgCl_2$. The porosity, due to pores, up to 1 μm was 0.152 cm$^3$/g while the average pore radius was 2610. Its average particle size (P50) was 71.1 μm. The SPAN was 1.8. Then, said adduct was used to prepare, according to the general procedure, the catalyst component the properties of which are reported in table 1. The catalyst was then used in a polymerization test carried out according to the procedure described above the results of which are reported in Table 2. In addition, part of the so obtained adduct particles have been subject to a mechanical stability test by ultrasounds treatment carried out according to the method described above. After 5 minutes treatment the P50 became 53.8 μm while the SPAN became 2.0.

Comparative Example 3

An $MgCl_2$-EtOH adduct prepared according to the procedure of Example 1 with the difference that a lower amount of water was employed. The compositional analysis showed that the particles contained 64.4% by weight of EtOH, 0.5% of water the remaining being $MgCl_2$. The porosity, due to pores, up to 1 μm was 0.115 cm$^3$/g while the average pore radius was 1640. Its average particle size (P50) was 67.3 μm. The SPAN was 1.6. Then, said adduct was used to prepare, according to the general procedure, the catalyst component the properties of which are reported in table 1. The catalyst was then used in a polymerization test carried out according to the procedure described above the results of which are reported in Table 2.

In addition, part of the so obtained adduct particles have been subject to a mechanical stability test by ultrasounds treatment carried out according to the method described above. After 5 minutes treatment the P50 became 33.8 μm while the SPAN became 2.6.

Example 4

The adduct prepared according to the procedure of Example 2 was thermally dealcoholated under nitrogen flow until the content of EtOH reached 54.3% b.w, while the water content was 1.8%. The so dealcoholated adduct showed a porosity of 0.258 cm$^3$/g and an average pore radius of 1774. Then, said dealcoholated adduct was used to prepare, according to the general procedure, the catalyst component the properties of which are reported in table 1. The catalyst was then used in a polymerization test carried out according to the procedure described above. The results are reported in Table 2.

Example 5

The adduct prepared according to the procedure of Example 2 was thermally dealcoholated under nitrogen flow until the content of EtOH reached 55.6% b.w, while the water content was 1.8%. The so dealcoholated adduct showed a porosity of 0.237 cm$^3$/g and an average pore radius of 1807. Then, said dealcoholated adduct was used to prepare, according to the general procedure, the catalyst component the properties of which are reported in table 1. The catalyst was then used in a polymerization test carried out according to the procedure described above. The results are reported in Table 2.

Example 6

The adduct prepared according to the procedure of Example 2 was thermally dealcoholated under nitrogen flow until the content of EtOH reached 57.5% b.w, while the water content was 1.8%. The so dealcoholated adduct showed a porosity of 0.151 cm$^3$/g and an average pore radius of 2065. Then, said dealcoholated adduct was used to prepare, according to the general procedure, the catalyst component the properties of which are reported in table 1. The catalyst was then used in a polymerization test carried out according to the procedure described above. The results are reported in Table 2.

Comparative Example 7

The adduct prepared according to the procedure of Comparative Example 3 was thermally dealcoholated under nitrogen flow until the content of EtOH reached 57.2% b. w. the water content was 0.4% b.w. The so dealcoholated adduct showed a porosity of 0.229 cm$^3$/g and an average pore radius of 1069. Then, said dealcoholated adduct was used to prepare, according to the general procedure, the catalyst component the properties of which are reported in table 1. The catalyst was then used in a polymerization test carried out according to the procedure described above. The results are reported in Table 2.

Comparative Example 8

The adduct prepared according to the procedure of Comparative Example 3 was thermally dealcoholated under nitrogen flow until the content of EtOH reached 54% b. w. the water content was 0.4% b.w. The so dealcoholated adduct showed a porosity of 0.249 cm$^3$/g and an average pore radius of 1155. Then, said dealcoholated adduct was used to prepare, according to the general procedure, the catalyst component the properties of which are reported in table 1. The catalyst was then used in a polymerization test carried out according to the procedure described above. The results are reported in Table 2.

TABLE 1

| Example | Ti % wt | Mg % wt | ID % wt |
|---|---|---|---|
| 1 | 2.9 | 19.3 | 10.1 |
| 2 | 3.3 | 19.2 | 9.6 |
| Comp. 3 | 2.7 | 19.4 | 10.8 |
| 4 | 3.1 | 19.4 | 8.9 |
| 5 | 3.0 | 19.5 | 8.9 |
| 6 | 2.8 | 19.2 | 10.2 |
| Comp. 7 | 2.7 | 19.3 | 11.3 |
| Comp. 8 | 3.1 | 18 | 13.4 |

TABLE 2

| Example | Activity | I.I | Polymer Porosity (cm$^3$/g) | Polymer Breaks |
|---|---|---|---|---|
| 1 | 66 | 96.9 | nd | Nd |
| 2 | 64 | 96.8 | nd | Nd |

TABLE 2-continued

| Example | Activity | I.I | Polymer Porosity (cm³/g) | Polymer Breaks |
|---|---|---|---|---|
| Comp. 3 | 56.6 | 97.5 | nd | nd |
| 4 | 69.7 | 97.2 | 0.183 | 3.7 |
| 5 | 73 | 97.6 | 0.186 | 3.8 |
| 6 | 73.3 | 97.6 | 0.126 | nd |
| Comp. 7 | 67.2 | 97.5 | 0.095 | 4.5 |
| Comp. 8 | 60.4 | 93.8 | nd | 4.3 |

What is claimed is:

1. A catalyst component comprising:
a solid adduct, wherein the solid adduct comprises magnesium chloride and ethanol; wherein the moles of ethanol per mole of magnesium chloride ranges from 2 to 5, and wherein the solid adduct has a ratio between the average pore radius of the adduct measured in Angstroms, as determined by mercury porosity and due to pores up to 1 μm, and the moles of ethanol per mole of magnesium chloride is higher than 500, wherein the mercury porosity is determined by intrusion of mercury under pressure using a porosimeter and the solid adduct has a mercury porosity ranging from 0.05 to 0.2 cm³/g with pores having an average pore radius from 0.18 to 0.35 μm.

2. The catalyst component of claim 1, wherein the ethanol is present in an amount ranging from 2.2 to 4.5 moles.

3. The catalyst component of claim 1, wherein the solid adduct has a spherical morphology and an average diameter between 5 and 150 μm.

4. The catalyst component of claim 1, wherein the solid adduct is prepared by
(i) mixing $MgCl_2$, and ethanol to form a $MgCl_2$-ethanol adduct;
(ii) heating the $MgCl_2$-ethanol adduct at or above the melting temperature of $MgCl_2$-ethanol adduct, until the adduct is completely melted;
(iii) adding water until the melted $MgCl_2$-ethanol adduct is present in a concentration in water of at least 0.8%, based upon the total volume of the $MgCl_2$-ethanol adduct and water mixture;
(iv) emulsifying the $MgCl_2$-ethanol adduct and water mixture in a liquid medium which is immiscible with the $MgCl_2$-ethanol adduct and water mixture, wherein the liquid medium is and chemically inert to the $MgCl_2$-ethanol adduct and water mixture; and
(v) quenching emulsion of step (iv) by contacting the emulsion of step (iv) with an inert cooling liquid producing the solid adduct.

5. The solid catalyst component of claim 4, wherein the solid adduct is reacted with at least one transition metal compound.

6. The solid catalyst component of claim 5, wherein the transition metal compound is $TiCl_4$.

7. The solid catalyst component of claim 5, wherein the reaction between the transition metal compound and the solid adduct is carried out in the presence of an internal electron donor compound selected from the group consisting of diisobutylphthalate, n-butylphthalate, and di-n-octylphthalate and an external electron donor comprising cyclohexylmethyldimethoxysilane.

8. The solid catalyst component of claim 5, further comprising the product of the reaction between the solid catalyst component, and an organoaluminum compound.

9. The solid catalyst component of claim 8, wherein the organoaluminum compound is an Al-trialkyl compound.

10. The solid catalyst component of claim 1, wherein the solid catalyst component is contacted with an olefin of formula $CH_2$=CHR, in which R is hydrogen or a hydrocarbon radical having 1-12 carbon atoms, to product a polyolefin.

11. A process comprising polymerizing an olefin of formula $CH_2$=CHR, in which R is hydrogen or a hydrocarbon radical having 1-12 carbon atoms, by contacting the olefin with the solid catalyst component of claim 1 to produce a polyolefin.

12. The solid catalyst component of claim 1, wherein the ratio between the average pore radius of the adduct measured in Angstroms, as determined by mercury porosity and due to pores up to 1 μm, and the moles of ethanol per mole of magnesium chloride is higher than 540.

* * * * *

UNITED STATES PATENT AND TRADEMARK OFFICE
CERTIFICATE OF CORRECTION

PATENT NO. : 9,598,509 B2
APPLICATION NO. : 13/996629
DATED : March 21, 2017
INVENTOR(S) : Gianni Collina et al.

It is certified that error appears in the above-identified patent and that said Letters Patent is hereby corrected as shown below:

In the Specification

| | | |
|---|---|---|
| Column 3 | Line 46 | Delete "Ti(OBu)₃C1." and insert --Ti(OBu)₃Cl.-- |
| Column 3 | Line 67 | Delete "1,3 diethers" and insert --1,3-diethers-- |
| Column 4 | Line 37 | Delete "below))" and insert --below)-- |
| Column 5 | Line 39 | Delete "thexyltrimethoxysilane." and insert --t-hexyltrimethoxysilane.-- |
| Column 5 | Line 41 | Delete "1,3 diethers" and insert --1,3-diethers-- |
| Column 6 | Line 54 | Delete "Erba." and insert --Erba).-- |
| Column 6 | Line 67 | Delete "2000μ," and insert --2000 μm,-- |
| Column 7 | Line 4 | Delete "Hidro" and insert --Hydro-- |

In the Claims

| | | |
|---|---|---|
| Column 11 | Line 15 | In Claim 1, delete "ethanol;" and insert --ethanol-- |
| Column 11 | Line 33 | In Claim 4, after "by", insert --:-- |

Signed and Sealed this
Twenty-ninth Day of October, 2019

Andrei Iancu
*Director of the United States Patent and Trademark Office*